Figure 1:
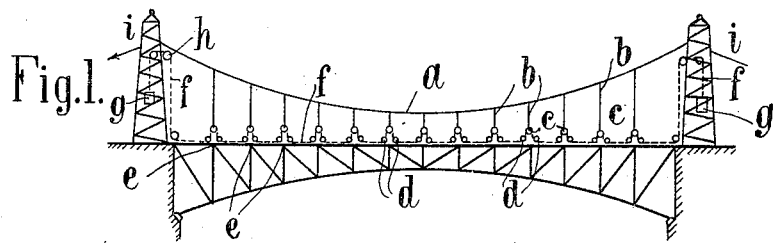

O. THOMAS.
BRIDGE.
APPLICATION FILED OCT. 24, 1907.

903,630.

Patented Nov. 10, 1908.

2 SHEETS—SHEET 1.

Witnesses.
Jesse N. Sutton
B. W. Sommers

Inventor.
Oscar Thomas
by Henry Orth Jr.
Atty.

THE NORRIS PETERS CO., WASHINGTON, D. C.

O. THOMAS.
BRIDGE.
APPLICATION FILED OCT. 24, 1907.

903,630.

Patented Nov. 10, 1908.

2 SHEETS—SHEET 2.

Witnesses.
Jesse N. Lutton
R. V. Sommers

Inventor.
Oscar Thomas
by Henry Orth
Atty.

UNITED STATES PATENT OFFICE.

OSCAR THOMAS, OF GRÜNBERG, GERMANY.

BRIDGE.

No. 903,630.      Specification of Letters Patent.      Patented Nov. 10, 1908.

Application filed October 24, 1907. Serial No. 399,048.

*To all whom it may concern:*

Be it known that I, OSCAR THOMAS, a subject of the King of Prussia, residing at 7 Breslauerstrasse, Grünberg, Province of Silesia, Germany, have invented certain new and useful Improvements in Bridges; and I do hereby declare the following to be a full, clear, and exact description of the invention.

When the cables of a suspension bridge with jointless stiffening supports are given a constant tension, the stiffening supports receive a uniform relief *i. e.*, the weight of the load is wholly or partially transferred to the cable and another peculiar bridge system results the external appearance of which has in general much similarity with the stiffened cable bridges but which differs therefrom very advantageously in many points. Now among other propositions it has been suggested to give the cables from the beginning an invariable horizontal tension, by replacing the anchoring of each cable by a suspended weight. It must however be taken into consideration that firstly in large bridge constructions—for only such here come seriously in question—the tension weights would have to be of a very extraordinary size, and would therefore necessitate too much space and expense, and secondly, more particularly in the case of temporary bridges, in which the relieving cables should more frequently find advantageous application, the determination of sizes and the mounting of the weights could not be executed sufficiently rapidly and with the requisite exactness. Further with the size and construction of the suspended weights it is hardly possible to rapidly and easily suspend their action for the purpose of any testing, such as trial loads and the like. Finally, also, in case the weight is not suspended on the cable end, but between this and the piles or piers variations of temperature and the traffic loads alter the shape of the retaining cable and thus the action of the stretching weight in such a way that the intended object, viz. of imparting to the girders or supports a uniform relief, can only be very incompletely attained. The said proposals have therefore up to the present, at least in bridge construction, not been carried out in practice. It may also be remarked that the said arrangements have the great drawback that the cables are greatly affected by the vibratory effect of the traffic, as in consequence of their firm attachments to the superstructure (suspension rods) they must follow each time the flexion of the latter.

In accordance with this invention the cables or chains are firmly anchored in the ordinary way, and their desired constant tension is attained by a series of pulleys being mounted on each cable and on the superstructure over which a cable or cord stretched by means of a weight is carried in coils, the separate parts of the cable or cord between two pulleys thus partially taking the place of the ordinary fixed tie bands. Cable or cord, supports and pulleys thus together form a pulley block and each drum of the cable has, if friction be disregarded, a tension which is equal to the weight suspended on the rope end. Thus it will be seen that I provide an anchored cable over the bridge truss work or superstructure, and between the anchored cable and the superstructure I place a flexible load-equalizing means. This flexible load-equalizing means comprises a rope or chain passing over pulleys connected to the superstructure and anchored cable, and are variously arranged.

Figure 2:
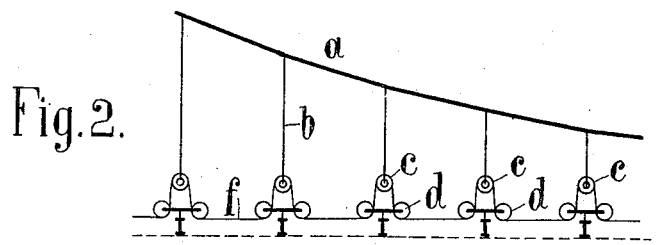
Figure 3:
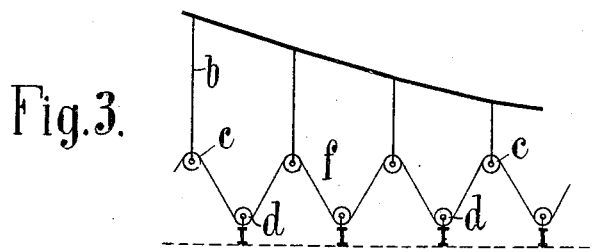
Figure 4:
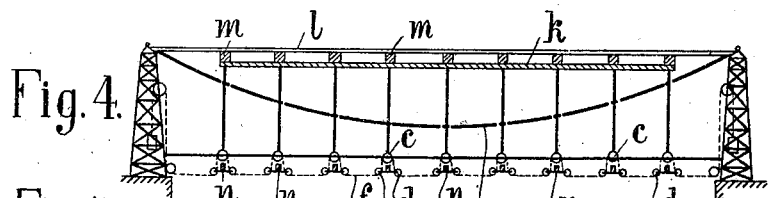
Figure 5:
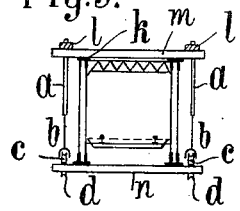
Figures 6, 7:
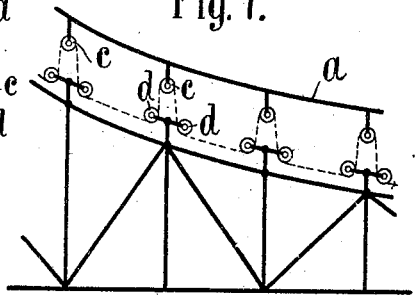
Figure 8:
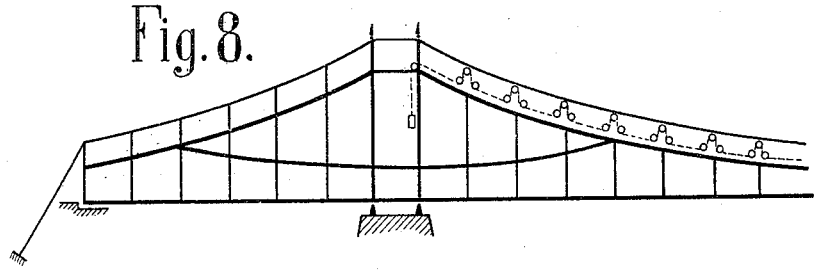
Figure 9:
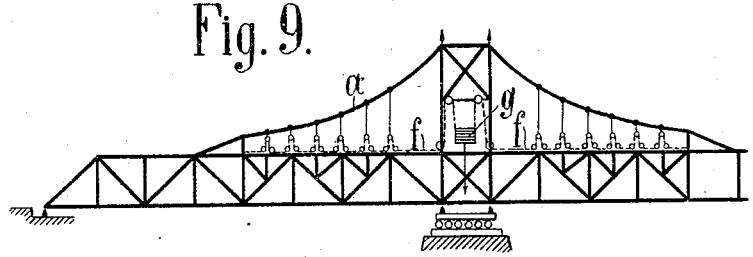
Figure 10:
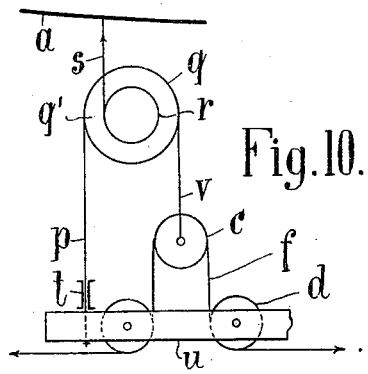
Figure 11:
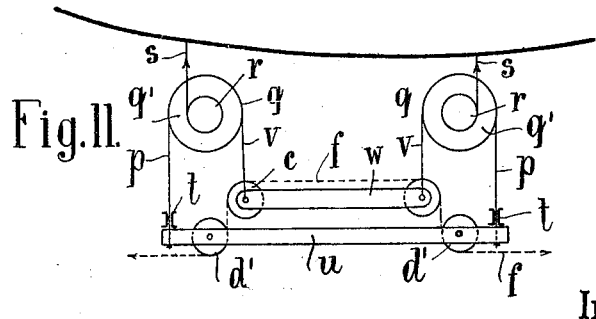

Some forms of construction of the object of the invention are shown in the accompanying drawings, in which:

Figure 1 shows the application of the invention to an arched bridge with a straight upper beam. Fig. 2 illustrates an arrangement in which the lower pair of pulleys is mounted on cross ties. Fig. 3 illustrates an arrangement of pulleys whereby the tension rope has an inclined direction between the pulleys. Fig. 4 illustrates a bridge truss having a horizontal upper and lower chord relieved by a cable. Fig. 5 is a transverse section of Fig. 4. Fig. 6 is a detail showing the arrangement of the pulleys. Figs. 7 and 8 illustrate a suspension bridge in which the relieving cable is parallel with the upper chord. Fig. 9 illustrates a draw-bridge provided with a relieving cable. Fig. 10 illustrates a differential pulley block used in connection with the cable. Fig. 11 a modification of differential pulley blocks.

Rollers $c$ are attached by means of tie bands $b$ to the firm anchored cable $a$, the tie bands $b$ being preferably of such lengths that the axes of the rollers $c$ lie approximately in a horizontal plane. On the other hand each roller is preferably suspended in the vertical transverse plane through a tie point $e$ of the beam at each of which points a pair of rollers $d$ is secured to the beam.

A cable $f$ is passed round all the pulleys $c$ and $d$ as shown in Fig. 1. This cable or chord also passes over pulleys $h$ to the uprights or piers $i$ and supports at each of its free ends inside the piers a weight $g$. It is evident that, apart from friction, the cable $f$ has a tension at all places corresponding to the weights $g$, and that therefore each vertically running part of the rope $f$ relieves the beam to the amount of the weight $g$. The relief at each tie point amounts to $2g$ under any traffic load on the bridge where $g$ is equal to the weight on the end of the cable in the piers. All the tie bands receive the same tensional strain dependent on the size of the tension (or cable stretching) weights. The relief may also be allowed to act on the cross supports (Fig. 2) or even on the longitudinal supports by means of a simple auxiliary construction, equally as well as in the tie points of the main supports or beams. The weight of the main beams may thereby not only be reduced but also that of the cross constructions.

In the form of construction shown in Figs. 1 and 2 the rope or cable passes alternately over one roller on the relieving cable and two rollers on the bridge construction in such a way that it runs partly vertically and partly horizontally.

In the arrangement shown in Fig. 3 an equal number of rollers are arranged above and below and the separate parts of the wire rope run obliquely, for instance, at about 45°. This arrangement is however more unfavorable than that according to Figs. 1 and 2 as it involves a greater height of construction for the pulley blocks and greater tension or stretching weights. In it also the pulley blocks in consequence of the variations of temperature and flexion through the traffic load vary in their action, while in the arrangement shown in Figs. 1 and 2 both are without any deleterious action. Further the arrangement shown in Fig. 3 necessitates a very exact mounting, while in that shown in Figs. 1 and 2 even considerable errors in mounting do not alter the correct action of the pulley blocks. The arrangement shown in Figs. 1 and 2 is therefore preferable in every respect. With it tie bands may be entirely dispensed with, if the upper rollers be directly attached to the cable, so that the pull or tension ropes entirely replace the tie bands. By the insertion of the pulley blocks a perfectly automatic regulation of the distances between the supporting cable and the framework is attained, and time and trouble saved in the erection, which is of the greatest importance more particularly in the case of temporary bridges, and the like.

In order to make the action of the relieving device as far as possible independent of frictional resistance the rope or cord pulleys are provided with ball or roller bearings. In order further to limit to a minimum the influence of the rope rigidity and to enable the diameter of the rope pulleys to be kept as small as possible, the suspension members may be formed of a large number of thin wire ropes.

Where the frictional resistances cannot be removed, they have only a favorable influence for that matter on the superstructure which is to be relieved, as they act when traffic is crossing the bridge, that is to say at critical moments, towards increasing the relieving action, while they have as a consequence, when there is no traffic on the bridge, a diminution of the relieving action. The frictional resistances thus only produce immaterially increased loads in the cables and pulley blocks, for which also allowance can be made in determining the dimensions of these parts. The amount of the relief may be very different. It can in fact either constitute only a fraction of the weight of the iron, or the entire weight of the iron, or even a smaller or larger part of the traffic load. In most cases it is preferable to make the amount of the relief at the most equal to the total weight of the iron, in order that the main girders may not be subjected to substantially only the traffic load strains.

The object of the invention possesses considerable advantages over ordinary suspension bridges, which advantages principally result from the automatic regulation of the length of the connections between cables and framework. Apart from the fact that the static determination is much easier, because it may be attained without a joint in the relieved beams or supports, variations of temperature, faults of erection and any yielding of the anchoring can exert no deleterious influence. The loading of the relieving cable is practically invariable, wherefore very high strains are admissible thereon. The degree of movement of the superstructure under the traffic load is much less as flexions and vibrations are smaller. The independence of variations of temperature also allows of the use of the relieving cable in connection with well known arched beams. This is not possible without the interpolation of the pulley block, as by calculation it has already been ascertained that the cable or chain without the use of pulley blocks would be ineffective at 10° C. increase of temperature and the arch alone would then have to carry the load.

The superiority of the bridges with relieving cables in accordance with this invention as compared with the ordinary suspension bridges, is shown more particularly in bridges having several spans. If for instance $n$ be the number of spans or openings of equal width and similar form, the horizontal pull arising under the traffic load, on the weighting of only one opening, amounts to only $1/n$ of that of a suspension bridge with one opening. The resistance to bending of the stiffening beams is thus greater and the external forces approximate thus to those of the beam supports. In superstructures with relief cables the conditions where there is a large number of openings are precisely opposite to, that is to say more favorable than, in the case of a single opening, as the cost for the anchorings, retaining cables and the like are distributed equally as in the case of the ordinary suspension bridges over several openings, while the action of the relieving device remains equally as favorable as before. The bridges with relieving cables are however not only superior in an economical sense to the ordinary suspension bridges with several openings, but even to those with one opening. While the ordinary suspension bridges are only adapted to successfully compete with beam bridges from spans of about 200 meters, in the case of bridges relieved by cables, this is the case even in spans of 100 meters and less, according to the system of the main supports or beams, the number of the openings, and so forth.

A further great advantage is that the relieving device may be rapidly and easily rendered, wholly or partially inactive or ineffective, all the tensional weights or only those of one end of the bridge being far enough counteracted for one-sided loading. In this way loading tests in particular may be easily carried out. If the weight of an entirely counteracted bridge itself without the traffic load be equal to the traffic load, it is only necessary to entirely remove the weights to load the bridge corresponding to the traffic load. If the traffic load be smaller than the weight of the bridge itself, it is only necessary to remove a corresponding portion of the stretching weight or weights. It must also be regarded as an appreciable advantage of the relieving cable, that conclusions can be drawn without difficulty as to the flexion of the girders or supports from the amount of the movement of the stretching weight when the traffic load is passing over the bridge.

Finally it must be remarked that the relieving cables may if necessary be exchanged much easier than the cables of a suspension bridge which have to carry the entire superstructure. In bridges with relieving cables the superstructure is in a position to entirely or at least partially carry itself, so that the necessary repairs may be done without separate auxiliary appliances and indeed mostly possible in intervals of traffic.

It is possible to apply the invention in very many ways. Relieving cables may be employed for strengthening existing bridges, immaterially whether they are of the beam or girder type, arched or suspension bridges, and whether the bridges are of iron, wood, ferro-concrete or stone. Particularly such bridges here come in question the capability of which to support the traffic loads is no longer equal to present requirements. The relieving cables may also be very advantageously employed for existing bridges exposed to temporary loads, more particularly railway bridges. In strengthening bridges, for instance, it is necessary to make the construction free of weight, that is to say to relieve it to the amount of the constant load, in order that the strengthening parts may be riveted to the too weak parts of the construction, while the latter are not under tension. By the use of relieving cables in such cases the bridge is perfectly independent of high water, the passage of ice and shipping. The strengthening of the bridge may also be carried out at any season, which is hardly possible with the relieving devices at present employed on account of the scaffoldings which are to be arranged in the bed of the stream. An important use for the relieving cables is found in the construction of colonial bridges. The use of relieving cables in this case especially is very advantageous because the ease of construction and the possibility of the erection without any scaffolding plays an important part. Finally, the relieving cables may also be advantageously employed in permanent bridges of all kinds more particularly in large bridges and bridges having very large spans, in such cases where fixed scaffoldings are very expensive or where they cannot be employed by reason of high water level, or the passage of ice or shipping. The relieving cables may also be combined very advantageously with single or double-armed swing bridges such as is shown in Fig. 9 in connection with a double-armed pivoting or swing bridge. Here the cables and pulley blocks serve not only for relieving the weight but also principally for lifting the superstructures off the end supports. For this object it is only necessary to increase the common weight $g$ hanging on the cables $f$, which is most simply done by a downwardly directed pull. The operating power necessary for this is extremely small as compared with the weights in question, as the swing bridge in a condition for use rests on the end supports with only a small pressure. Such swing bridges are consequently particularly economical as regards their moving mechanism, and especially as the trusses may be made much lighter when using the relieving arrangement provided by means of the cable. In cases where an anchoring of the relieving cable cannot be carried out or involves great difficulties the horizontal strain of the cable may be taken up by a tie. This case is shown in Figs. 4 and 5 in a bridge having horizontal upper and under ties. Over the upper tie lies the tie $l$. Where wood is employed for the tension tie $l$ it may be made very simply and cheaply. The ties $l$ are interconnected by cross supports $m$ which rest on the upper beam. The pulley blocks engage on the cross supports $n$ lying beneath the under beam. The arrangement of the rollers may be the one shown in Fig. 6. The pairs of rollers $d$ are mounted in horizontal rails $o$ on which rails the cross supports $n$ which here are assumed to be of wood, rest. The tie bands $b$ attached to the cables $a$ carry the rollers $c$ lying over the cross supports $n$. If the upper ties $k$ of the superstructure which is to be relieved are not straight but curved, or do not lie over the profile of the roadway which is to be kept free, the cross supports $m$ carrying the ties $l$ must be arranged over this profile and brought into firm connection with the main supports of the superstructure by means of a separate auxiliary construction, (consisting of standards and head bands). The whole arrangement i. e. the block and pulley action, remains otherwise quite unchanged.

If the main supports have the form of suspension bridges the relieving cable may be preferably laid over the main support and allowed to run parallel with the upper tie. As shown in Fig. 7, the arrangement of the block and pulley may be effected in the simplest way between the relieving cable and the upper tie. The under pairs of rollers $d$ are firmly connected with the tie points, while the upper rollers $c$ are directly suspended on the cable $a$. In this way a comparatively small height is necessary for the relieving device.

In the system shown in Fig. 8 the foregoing arrangement is for instance employed. This system may advantageously be provided for the widest existing spans. The main supports may here be arranged as continuous or so-called "Gerber" supports and either with single or double piers or towers on the piles. On account of its common piers for the main supports and the relieving cable, this system is particularly economical. It affords also great advantages in erection as the main supports may be mounted either on the cable or freely projecting, the cable in fact being employed for relieving the freely projecting superstructure and for carrying the auxiliary fitting.

In order not to have too great a load on the rollers and their ball bearings, and thereby an unfavorable action, the relieving pulley block may be divided into a suitably calculated number of separate pulley blocks lying side by side, which preferably have also separate stretching weights. The same object may however be attained if, as shown in Fig. 10, a differential pulley block be interpolated in each suspension. The pulley $c$ is here not directly suspended on the relieving cable $a$ but on a rope or chain $v$ which is carried over a pulley $q$ attached to it. Two other pulleys $q'$ and $r$ are firmly connected with the pulley $q$. The chain $p$ laid round the pulley $q'$ and attached to it, is connected with the cross supports of the superstructure at the points $t$, while the chain $s$ passing round the pulley $r$ and attached to it, is connected with the relieving cable $a$. The pulleys $q$ and $q'$ have in Fig. 10 the same diameter, but may equally well be different. With pulleys of a similar diameter the chains $v$ and $p$ may be formed as a whole, but then the pulley must be toothed, which however would make the construction more complicated and expensive. The pairs of pulleys $d$ engage with an auxiliary support $u$. Such an auxiliary support must be provided in each second field. The differential pulley block $q$ $q'$ $r$ has no axis and therefore no bearings, and is consequently very effective with a small cost. As means for pulling the differential pulley block latchet chains are preferably employed and the two support chains $s$ and $p$ are made preferably double and also the pulleys $r$ and $q'$ belonging thereto, while the stretching chain $v$ with its pulley $q$ is made single.

If the relieving cable lies over the main support as in Figs. 7 and 8 the pair of pulleys $d$ may be directly connected with the upper tie of the main beam $s$ and the auxiliary beam $u$ can thus be dispensed with.

If in the block and pulley $c$, $d$, $d$, each two adjacent pulleys $c$, as shown in Fig. 11, are connected with one another by a lock bar $w$, instead of the pairs of pulleys $d$ $d$ hitherto employed only one pulley $d'$ is necessary. By this means the degree of effectiveness of the pulley block is increased, while its cost is decreased. With the same proportions of transfer of the differential pulley block the the tensional weight is thus doubled but its course is only half as much as in the previous arrangement (Fig. 10). As regards the auxiliary beam or support $u$ what has been hereinbefore mentioned applies here, that is to say it can be dispensed with if the relieving cable lies over the main beam, as then the upper tie of the latter takes the place of $u$. What has been hereinbefore stated as regards cables also evidently applies to chains and vice versa.

Having now particularly described and ascertained the nature of my said invention and in what manner the same is to be performed, I declare that what I claim is:

1. The combination with a bridge superstructure and a supporting cable or chain; of flexible load-equalizing means between said cable and the superstructure.

2. The combination with a bridge superstructure and a rigidly anchored cable (or chain); of flexible load-equalizing means between said cable and the superstructure at the panel points.

3. The combination with a bridge superstructure and a supporting cable (or chain); of pulleys connected to the cable and other pulleys connected to the bridge superstructure and a flexible member passing over the pulleys connected to the cable and to the superstructure and under approximately uniform tension under all conditions of loading.

4. The combination with a bridge structure, of an auxiliary supporting cable, pulleys connected to the cable and similar pulleys connected to the bridge structure at panel points, a flexible cable passing around both sets of pulleys, and weights suspended on the ends of said flexible cable to maintain approximately uniform tension therein.

5. The combination with a bridge structure, of an auxiliary cable (or chain) anchored at its ends and at each side of the bridge structure, and pulleys connected to the cable, a flexible cable passing around both sets of pulleys, and cross-ties connecting the pulleys of like panel points of opposite trusses of the bridge structure.

6. The combination with a bridge structure, of a cable (or chain) anchored at its ends, differential pulleys connected to the cable and pulleys connected to the bridge structure substantially at panel points, and a flexible cable passing around the pulleys on the bridge structure maintained under approximately uniform tension.

7. The combination with a bridge superstructure, of a cable, an auxiliary chord to which the ends of the cable are anchored, pulleys connected to the cable and pulleys connected to the bridge structure substantially at panel points, a cable passing around the pulleys and weights suspended from the ends of said cable to maintain it at a substantially uniform tension under all conditions of loading.

8. The combination with a bridge structure, of a cable (or chain), anchored at its ends, differential pulleys $r, q, q'$, interpolated between the cable and the bridge structure and connected to pulleys $c$, and a flexible cable maintained under approximately uniform tension over said pulleys $c$.

In testimony that I claim the foregoing as my invention, I have signed my name in presence of two subscribing witnesses.

OSCAR THOMAS.

Witnesses:
JOHANNE CLEIN,
WOLDEMAR HAUPT.